Feb. 7, 1956   R. P. MITCHELL   2,733,601
PORTABLE BOAT SPEEDOMETER
Filed Dec. 14, 1953

REGINALD P. MITCHELL
INVENTOR.

BY *Herbert J. Brown*
ATTORNEY

United States Patent Office 2,733,601
Patented Feb. 7, 1956

2,733,601

PORTABLE BOAT SPEEDOMETER

Reginald P. Mitchell, Fort Worth, Tex., assignor of one-third to Robert C. Matteson and one-third to Sylvester D. Matteson, Jr., both of Fort Worth, Tex.

Application December 14, 1953, Serial No. 397,810

1 Claim. (Cl. 73—182)

This invention relates to instruments for measuring the relative velocities of liquids, and has particular reference to a portable device for determining the speeds of motor boats. The invention is also capable of other uses, such as measuring the velocity of flowing quantities of water, as the rate of flow of streams and rivers, the velocities of streams ejected from nozzles, and many related uses.

An object of the invention is to provide a relatively small and convenient instrument for measuring velocities and relative velocities of liquids.

Another object of the invention is to provide an instrument for the described purpose which is easily read by manually lifting the same to eye level.

A further object of the invention is to provide an instrument of the described class which may be read subsequent to subjecting the instrument to the flowing or relatively flowing liquid.

A still further object of the invention is to provide a portable speedometer for measuring the velocities of liquids and one which may be quickly and conveniently reset after a reading in preparation for a subsequent reading.

These and other objects of the invention will become apparent from the following description and the accompanying drawing, wherein.

Figure 1:
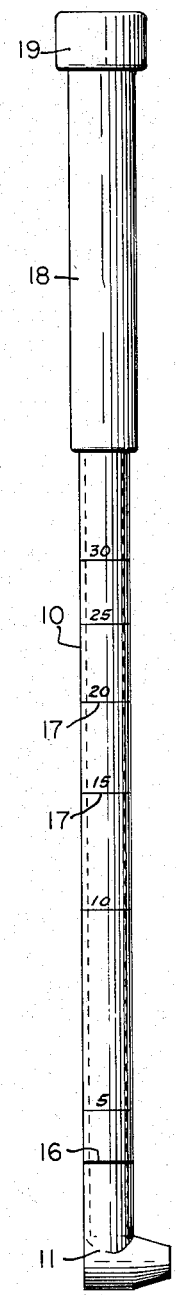
Figure 1 is an elevation of a liquid velocity measuring instrument embodying the features of the invention.
Figure 3:
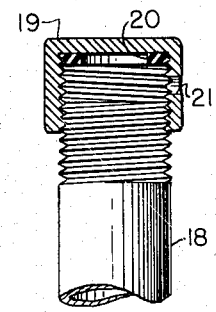
Figure 3 is a broken elevation and sectional view of the upper end of the illustrated instrument and showing the cap in its raised position for bleeding entrapped liquids.
Figure 4:
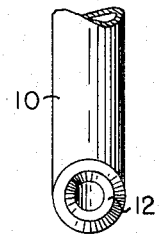
Figure 4 is a broken elevation of the lower end of the instrument taken at a right angle with respect to Figure 1.
Figure 2:
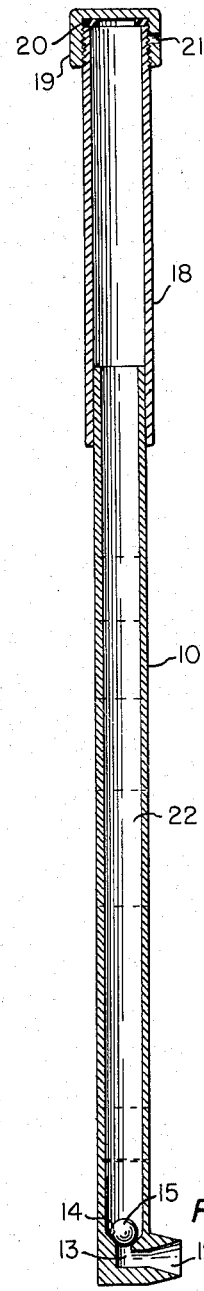
Figure 2 is a vertical sectional view of the instrument shown in Figure 1.

The form of the invention shown includes a tubular body 10 of transparent material, such as glass or plastic, and has a transverse inlet or head 11 integrally secured to its lower end. The head 11 is provided with a lateral conical opening 12 and a vertical passage 13 communicating with the tubular body 10. A valve seat 14 is provided in the head 11 at the upper end of the passage 13 for receiving a ball check 15. While a ball check is shown, it is to be understood that other suitable checks or trap elements may be substituted by those versed in the art.

Above the head 11 and around the tubular body 10, there is a water line mark 16 for determining the depth of the head 11 beneath the water's surface when taking a reading. Calibrations 17 in miles per hour, determined by empirical tests, are provided around the body 10 at spaced intervals along the body length and above the water line mark 16. A tubular handle 18 is connected with the upper end of the body 10 and is hermetically sealed therewith. If desired, the handle 18 may be an extension of the body 10.

The upper end of the handle 18 is provided with a threaded cap 19 having a resilient ring seal 20 within the cap and adjacent the end of the handle. There is a bleed port 21 in the side of the cap 19, and when the latter is raised, as by partially unscrewing the same, the bleed port is above the end of the handle 18.

In operation, the head 11 is placed in the liquid with the opening 12 directed to oppose the direction of flow, as the case may be. The liquid enters the chamber 22 of the body 10 and compresses the air therein and the air in the body and handle 18. The amount of liquid received depends on the pressure of the liquid entering the inlet opening 12. When the last referred to pressure is relieved, as when removing the instrument from the liquid, the ball check 15 closes the passage 13, retaining the collected liquid in the body 10. The instrument may then be raised in an upright position to eye level for determining the reading. After the reading is taken, the cap 20 is partially unscrewed so as to raise the bleed port 21 above the end of the tubular handle 18. The entrapped liquid is then poured through the bleed port by tilting the body 10.

The invention is not limited to the exemplary construction herein shown and described, but may be made in various ways within the scope of the appended claim.

What is claimed is:

A portable speedometer adapted to have its lower end submerged in a body of water, said speedometer comprising a closed transparent tube having a lateral opening in one side of the lower end thereof communicating with the interior of said tube, and a check valve within the lower end of said tube arranged to close the referred to communication between said tube and said lateral opening.

References Cited in the file of this patent

UNITED STATES PATENTS 1,244,485    Fischer _____ Oct. 30, 1917

FOREIGN PATENTS 3,264    Great Britain _____ 1898
5,139    Great Britain _____ 1891